United States Patent
Stoehr et al.

(10) Patent No.: US 7,107,791 B2
(45) Date of Patent: Sep. 19, 2006

(54) METHOD FOR CHANGING THE BOUNDARY SURFACE TENSION OF A LIQUID GLASS PIECE AND APPARATUS FOR PERFORMING SAID METHOD

(75) Inventors: Ulrike Stoehr, Mainz (DE); Olaf Claussen, Ingelheim (DE); Ralf-Dieter Werner, Laufersweiler (DE)

(73) Assignee: Schott AG, Mainz (DE)

( * ) Notice: Subject to any disclaimer, the term of this patent is extended or adjusted under 35 U.S.C. 154(b) by 409 days.

(21) Appl. No.: 10/348,079

(22) Filed: Jan. 21, 2003

(65) Prior Publication Data

US 2003/0140655 A1    Jul. 31, 2003

(30) Foreign Application Priority Data

Jan. 25, 2002    (DE)    ................................. 102 02 766

(51) Int. Cl.
*C03B 40/00*    (2006.01)
(52) U.S. Cl. ............................ 65/24; 65/29.18; 65/170; 65/208; 65/268; 65/303; 204/243.1; 205/71
(58) Field of Classification Search .................... 65/24, 65/29.18, 127, 135.6, 169, 170, 208, 268, 65/284, 285, 303; 204/243.1; 205/71
See application file for complete search history.

(56) References Cited

U.S. PATENT DOCUMENTS

| | | | |
|---|---|---|---|
| 3,535,100 A | | 10/1970 | Galey et al. |
| 4,923,497 A | * | 5/1990 | Leber et al. .................... 65/86 |
| 5,573,715 A | * | 11/1996 | Adams et al. ............. 264/1.36 |
| 6,279,346 B1 | * | 8/2001 | Ribes et al. ................. 65/25.4 |

FOREIGN PATENT DOCUMENTS

| | | |
|---|---|---|
| DE | 38 15 974 | 8/1989 |
| GB | 1186131 | 4/1970 |
| JP | 06345448 A | 12/1994 |

* cited by examiner

*Primary Examiner*—Sean Vincent
(74) *Attorney, Agent, or Firm*—Michael J. Striker

(57) ABSTRACT

The process according to the invention reduces the effort required to shape a glass piece. In this process a liquid glass piece is provided on a structured supporting surface of an electrically conducting base. A voltage is applied across the liquid glass piece by connecting a voltage source between a contact position on the liquid glass piece and the electrically conducting base. The apparatus for performing the process has an electrically conducting base on which the liquid glass piece is supported and a device for applying a voltage between a contact position on the liquid glass piece and the electrically conducting base.

13 Claims, 3 Drawing Sheets

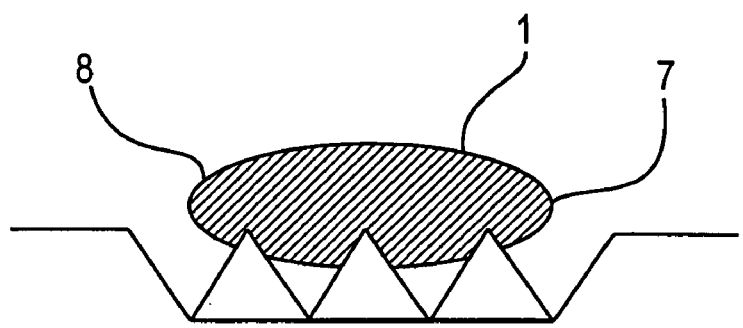
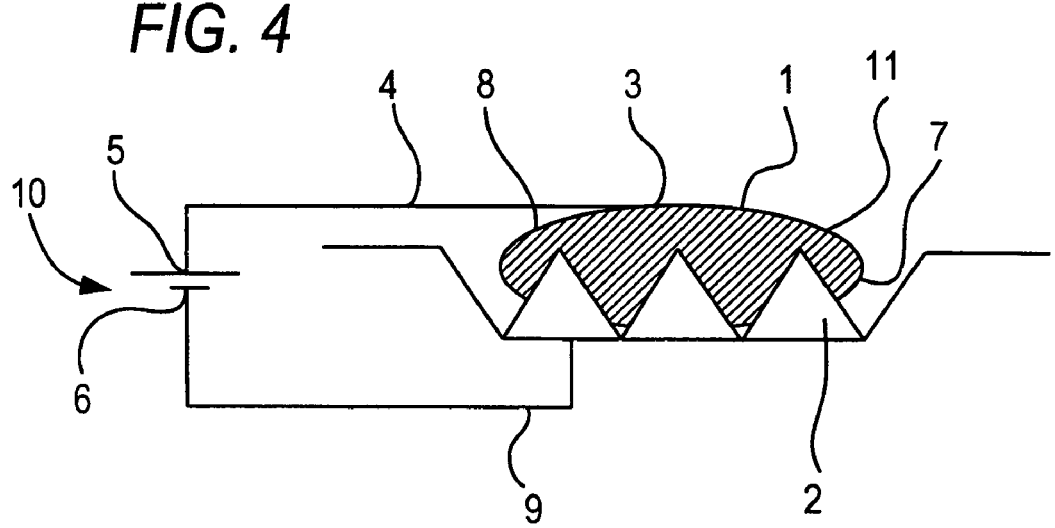
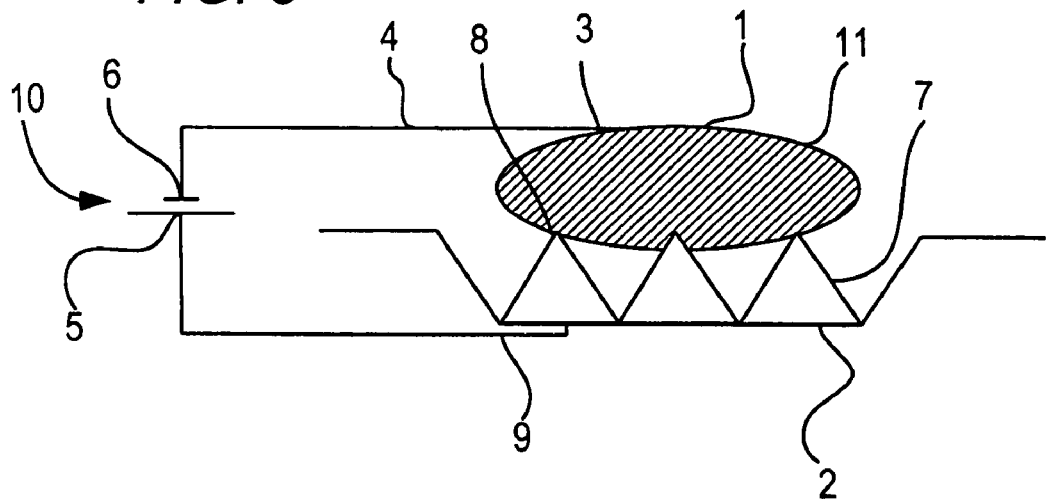

METHOD FOR CHANGING THE BOUNDARY SURFACE TENSION OF A LIQUID GLASS PIECE AND APPARATUS FOR PERFORMING SAID METHOD

BACKGROUND OF THE INVENTION

1. Field of the Invention

The present invention relates to a method for changing a boundary surface tension of a liquid glass piece. It also relates to an apparatus for performing that method.

2. Description of the Related Art

Currently after a casting process for making them manufactured optical lenses and also other curved glass bodies are ground in several grinding or working steps, which provide them with a predetermined radius of curvature. The individual grinding and polishing steps however cause high manufacturing costs because they are highly time consuming and because of the expensive machine engineering.

A generic process is disclosed in U.S. Pat. No. 3,535,100, in which the shape of a liquid glass piece is changed. In this process the liquid glass piece is supported on an electrically conducting support and an electrical potential is applied to the liquid glass piece by contacts connectable with the liquid glass piece.

The electrically conducting support itself is an electrically conducting liquid in the case of this reference. Current flow within the liquid glass piece changes the boundary surface tension, which changes the shape of the glass sample. Problems are encountered using this process for optical glass, which has high specifications in regard to shaping and purity. The reason for this is the inhomogeneous behavior of ions contained in the liquid glass piece, especially alkali ions, with progressing time, since the liquid glass piece cools over the course of time.

SUMMARY OF THE INVENTION

It is an object of the present invention to provide a generic process for changing the boundary surface tension of the liquid glass piece, whereby the above-described problem due to the inhomogeneous behavior of ions in the glass piece can be solved.

It is another object of the present invention to provide an apparatus for performing the process according to the invention.

The process according to the invention for changing the boundary surface tension of a liquid glass piece placed on an electrically conducting base includes applying an electrical potential to the liquid glass piece resting on the electrically conducting base at a contact position on the liquid glass piece and heating the liquid glass piece on the electrically conducting base. By heating the liquid glass piece the temperature of the glass piece is kept constant during the application of the voltage to the glass piece.

The surface tension of the glass in the liquid state is influenced by its chemical composition so that, for example, a decreasing content of alkali ions or alkaline earth ions causes an increase of the boundary surface tension.

By applying an electrical potential the moving ions, such as e.g. the alkali ion $Na^+$, are forced from the boundary surface of the glass piece into its interior. They are enriched on the negatively polarized side of the boundary surface and thinned out on the positively polarized side, which produces an effect on the boundary surface. A positive polarization of the supporting surface causes an increase of the boundary surface voltage, an increase of the wetting angle and consequently a lowering of the wetting of the surface.

With the help of the new method the filling of a certain shaping region of the supporting surface during shaping can be controlled. This is true both in the microscopic sense for microstructures and porosity of the shaping material but also in the macroscopic sense, for example for the filling of corners in the shape.

Because of the reduction of the wetting that the method produces a smoothing of the surface of the liquid glass piece to be shaped occurs, whereby the roughness of the shaping tool or the local damage are not pressed into the glass body to their full extent. Moreover it is possible to provide an exact transfer of the structures formed on the shaping tool to the liquid glass piece to be shaped. This would be possible without the application of voltage when the glass piece is at a higher temperature, since then both the viscosity and also the surface tension of the glass piece will decrease. However the danger of adhesion increases with increasing temperature of the glass piece. Moreover the evaporation of volatile components from the glass piece and thus the contamination of the shaping tool is reduced by the method according to the invention.

The apparatus for changing a boundary surface tension of a liquid glass piece includes an electrically conducting base on which the liquid glass piece rests and electrical contacting means connectable electrically to the liquid glass piece to apply an electrical potential to the liquid glass piece. The electrical conducting base is formed for heating the liquid glass piece to control the temperature of the glass piece during application of the voltage.

The contacting means preferably includes a wire connected electrically to a contact position of the liquid glass piece.

Preferred embodiments of the apparatus according to the invention include a source for producing an electrical potential, which is a D.C. voltage source, producing a D.C. voltage between 0.1 to 100 V.

Alternatively the source for producing the electrical potential produces an asymmetric alternating voltage with a D.C. voltage component of from 0.1 to 100 V.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which:

FIG. 3 is a diagrammatic view of the liquid glass piece on a shaping tool without application of a voltage;

FIG. 4 is a diagrammatic view of the liquid glass piece on the shaping tool when the base has a negative potential and the electrical contact position has a positive potential;

FIG. 5 is a diagrammatic view of the liquid glass piece on the shaping tool when the base has a positive potential and the electrical contact position has a negative potential;

DETAILED DESCRIPTION OF THE INVENTION

Figure 1A:
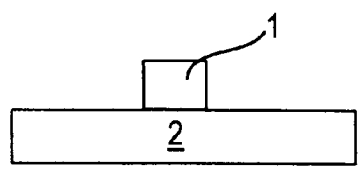
FIG. 1a is a schematic side view of a solid glass piece and an electrically conducting base.
Figure 1B:
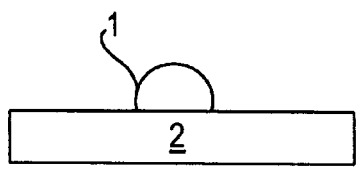
FIG. 1b is a schematic side view of a liquid glass piece and an electrically conducting base.

FIG. 1 a shows a solid glass piece 1, which is heated on an electrically conducting base 2. It is also possible to put a heated liquid glass piece 1 on the electrically conducting base 2.

Figure 2A:
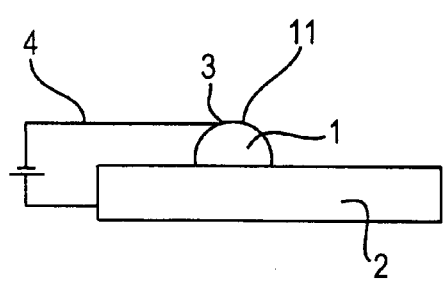
FIG. 2a is a diagrammatic side view of the arrangement shown in FIG. 1b prior to applying a voltage to the liquid glass piece at an electrical contact position.
Figure 2B:
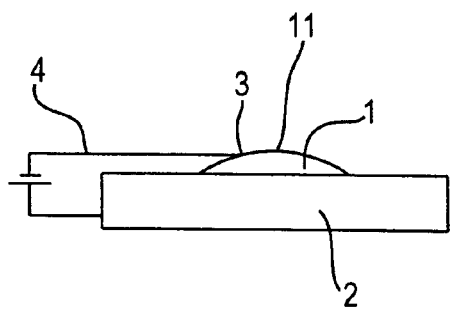
FIG. 2b is a diagrammatic side view of the arrangement shown in FIG. 2a after applying the voltage to the liquid glass piece.

The free surface 11 of the liquid glass piece and the electrically conducting base 2 are electrically connected with the wire 4 via the electrical contact position 3. While the glass piece has a generally spherical shape without application of a voltage as shown in FIG. 2a, the boundary surface voltage changes because of the migration of mobile ions in the glass network when voltage is applied to the liquid glass piece. As a result the liquid glass piece takes a different shape.

FIG. 3 shows a liquid glass piece 1 on a structured shaping surface 7. The peaks 8 of the shaping surface 7 penetrate the glass piece 1 to a middle depth. No electrical potential is applied to the liquid glass piece 1.

The structured shaping surface 7 shown in FIG. 4 is on an electrically conducting base 2 in contrast to the arrangement in FIG. 3. It is connected by means of an electrical conductor 9 with a current source 10. The electrically conducting base 2 is connected with the negative pole 6 of the current source 10 in the arrangement shown in FIG. 4. The wire 4 connected to the contact position 3 is connected with the positive pole 5. The peaks 8 present on the structured shaping surface 7 penetrate deeper in the liquid glass piece 1 than in the arrangement without the applied voltage because of the changed boundary surface tension.

FIG. 5 similarly shows a glass piece 1 on a structured shaping surface 7 with an electrical connection to the free surface 11 at the contact position 3 made by means of the wire 4. In FIG. 5 the negative pole 6 of the current source 10 is connected to the contact position 3 and the positive pole 5 is connected to the electrically conducting base 2. This has the consequence that the glass piece scarcely sinks into the structured shaping surface 7 at all in comparison to the arrangement shown in FIGS. 3 and 4. Thus the glass piece is hardly structured at all with the arrangement shown in FIG. 5.

Figure 6:
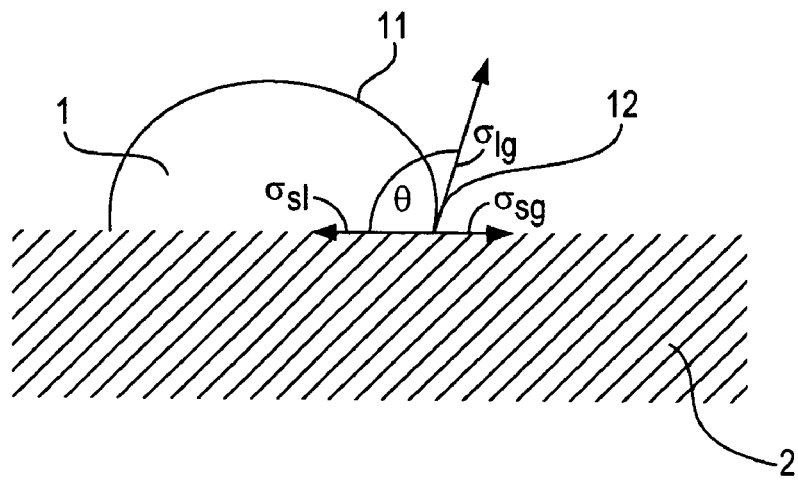
FIG. 6 is a diagrammatic view of a liquid glass piece resting on a supporting surface with a wetting angle shown.

The boundary surface tensions at the three phase boundaries between the solid, liquid and gas on the liquid glass piece 1 resting on the electrically conducting base 2 are illustrated vectorially with the aid of FIG. 6. A boundary surface tension $\sigma_{sg}$ resulting from the two-phase boundary between the solid and the gas acts outwardly from the liquid glass piece starting from an origin 12. A boundary surface tension $\sigma_{sl}$ resulting from the two-phase boundary between the solid and the liquid acts in the opposite direction. A boundary surface tension $\sigma_{lg}$ resulting from the two-phase boundary between the liquid and the gas acts tangentially to the free surface 11 from the origin 12. The boundary surface tension $\sigma_{sl}$ and the boundary surface tension $\sigma_{lg}$ thus span a contact angle $\theta$, whose value can be calculated by the Young equation:

$$\sigma_{sg} = \sigma_{sl} + \sigma_{lg} * \cos\theta.$$

Figure 7:
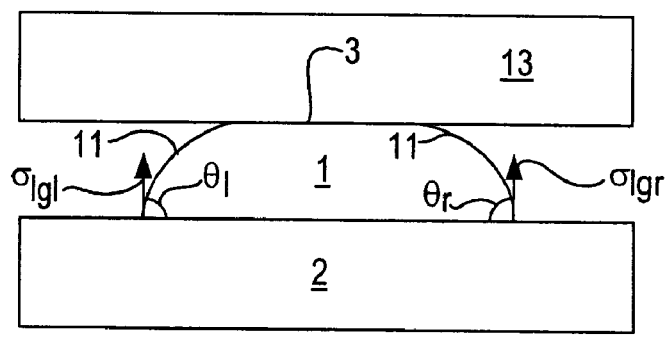
FIG. 7 is a diagrammatic side view of a liquid glass piece on a supporting surface showing right and left wetting angles.

FIG. 7 shows a liquid glass piece 1 resting on an electrically conducting base 2, which is contacted with an upper metal sheet 13 instead of a wire 4. The contact position 3 comprises a comparatively large contacting surface region. The two-phase boundary surface tensions $\sigma_{lgl}$ and $\sigma_{lgr}$ tangential to the free surface 11 on the left and right of the liquid glass piece 1 at the three-phase boundary between solid, liquid and gas are diagrammatically shown in FIG. 7.

Figure 8:
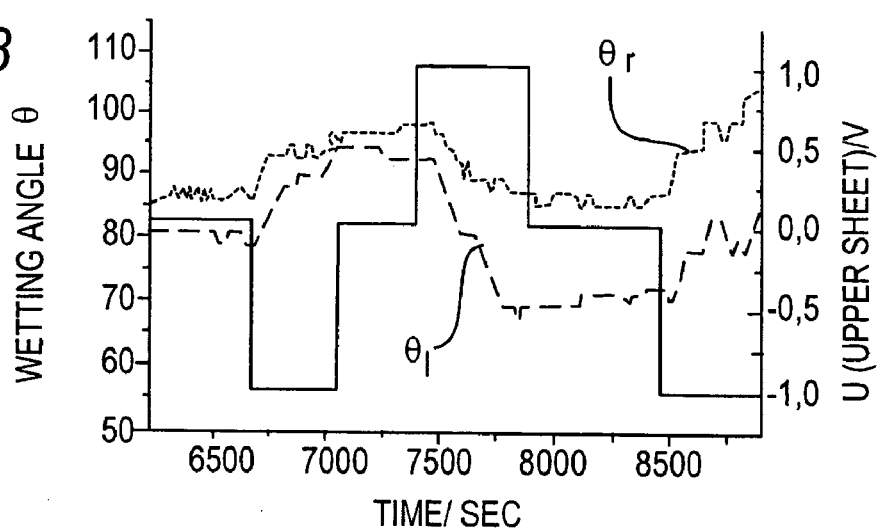
FIG. 8 is a graphical illustration showing the behavior of the wetting angles when the applied voltage applied varies with time.

Experimental results from a group of experiments are shown in diagrammatic form in FIG. 8. The graphical illustration in FIG. 8 shows the variation of the applied voltage and the right and left wetting angles $\theta_r$ and $\theta_l$ with time. The applied voltage on the upper surface of the metal sheet 13 is read off the right ordinate, the wetting angle values off the left ordinate and the time off the abscissa.

At the beginning of the experiments the applied voltage was first 0 V, the right and left wetting angles $\theta_r$ and $\theta_l$ are between 80° and 90°. Subsequently the voltage on the upper metal sheet 13 changes to −1 V and is maintained for about 400 sec. During this time both wetting angles $\theta_r$ and $\theta_l$ increase about 15 and/or 10°.

Next the voltage is switched to 0 V and maintained for about 400 sec. During this time the wetting angles $\theta_r$ and $\theta_l$ remain at their previously attained values.

When the applied voltage is +1 V on the upper metal sheet both right and left wetting angles $\theta_r$ and $\theta_l$ drop. The previously more steeply increasing wetting angle $\theta_l$ also now drops more strongly. After 500 sec with the voltage at +1 V the voltage is switched off again for about 600 sec. In this time interval the wetting angles $\theta_r$ and $\theta_l$ remain at an approximately constant value. Then when the voltage of −1 V is applied to the upper metal sheet 13 the wetting angles again increase to the same extent.

The disclosure in German Patent Application 102 02 766.8-45 of Jan. 25, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a process for changing the boundary surface tension of a liquid glass piece and apparatus for performing this process, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for changing a boundary surface tension and shape of a liquid glass piece, said process comprising the steps of:
   a) heating a glass body to form the liquid glass niece;
   b) providing an electrically conducting solid base on which the liquid glass piece rests;

c) applying an electrical potential to the liquid glass piece resting on the electrically conducting solid base at a contact position on the liquid glass piece; and d) heating the liquid glass piece on the electrically conducting solid base during the applying of the electrical potential;

wherein the electrical potential is such that the boundary surface tension and the shape of the liquid class piece change.

2. The process as defined in claim 1, wherein the electrically conducting solid base is provided with a structure shaping surface for shaping said glass piece.

3. The process as defined in claim 1, wherein the electrically conducting solid base includes means for heating the liquid glass piece.

4. The process as defined in claim 1, wherein said electrical potential is a D.C. voltage between 0.1 to 100 V in order to change the surface tension of the liquid glass piece.

5. The process as defined in claim 1, wherein said electrical potential is an asymmetric alternating voltage with a D.C. voltage component of from 0.1 to 100 V.

6. An apparatus for changing a boundary surface tension and shape of
a liquid glass piece, said apparatus comprising means for controlled heating of a glass body to form the liquid class piece;
an electrically conducting solid base on which the liquid glass piece rests; and
electrical contacting means connectable electrically to the liquid glass piece to apply an electrical potential to the liquid glass piece;
so that the liquid glass piece is maintained at a constant temperature during application of said electrical potential and the boundary surface tension and the shape of the liquid glass piece change.

7. The apparatus as defined in claim 6, wherein said electrical contacting means comprises a wire or a metal sheet.

8. The apparatus as defined in claim 6, further comprising a source for producing said electrical potential and wherein said electrical potential comprises a D.C. voltage.

9. The apparatus as defined in claim 6, wherein said electrical potential is a D.C. voltage between 0.1 to 100 V.

10. The apparatus as defined in claim 6, wherein said electrical potential is an asymmetric alternating voltage with a D.C. voltage component of from 0.1 to 100 V.

11. The process as defined in claim 1, wherein the heating during the applying of the electrical potential is controlled to maintain a temperature of the liquid glass piece constant.

12. The apparatus as defined in claim 6, wherein the electrically conducting solid base is provided with a structured shaping surface for shaping said glass piece to form a structured surface on the glass piece.

13. The apparatus as defined in claim 6, wherein said electrically conducting solid base includes said means for controlled heating.

* * * * *